Patented May 31, 1932

1,860,479

UNITED STATES PATENT OFFICE

LEO ROSENTHAL, OF VOHWINKEL, NEAR ELBERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

SYNTHETIC RESINS

No Drawing. Application filed June 25, 1929, Serial No. 373,684, and in Germany July 2, 1928.

The present invention relates to a process of preparing synthetic resins and to the new products obtainable thereby.

According to the present invention, technically very valuable resins are prepared by treating crude solvent naphtha, advantageously freed from phenol and bases, with a catalyst as hereinafter defined exerting a polymerizing action upon the resinifiable constituents of the crude solvent naphtha, that means cumarone and indene, with the addition of a m-substituted aryl alkyl ether of the general formula:

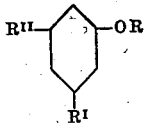

wherein R and R$^I$ stand for alkyl groups which may be similar or dissimilar to one another and R$^{II}$ stands for hydrogen which may be substituted by an alkyl group. Suitable for the purpose of the invention are all the catalysts generally used in the manufacture of cumarone resins (compare: The Journal of Industrial and Engineering Chemistry, vol. 8, 1916, pages 797 to 801) with the exception of aluminium chloride. Such suitable catalysts are, for example, tin tetrachloride, zinc chloride, strong sulfuric acid, ferric chloride, boro-fluoro acetic acid and antimony pentachloride.

The quantity of the m-substituted aryl-alkyl-ether may be varied within the widest limits, but generally I add about 5–25% to the reaction mixture calculated on the amount of the resinifiable substance present in the crude solvent naphtha.

In carrying out the process I add the requisite quantity of the catalyst, generally 0,5–20% calculated on the amount of the crude solvent naphtha, to the crude solvent naphtha aryl alkyl ether mixture with vigorous stirring, care being taken that the reaction temperature does not exceed 90° C.; generally I carry out the process between about 30–70° C., the temperature being regulated by gently heating or cooling. When the reaction is complete generally after several hours, the catalyst is removed by means of acids, alkalies, alkaline earths or metallic oxides and the volatile constituents are distilled off completely from the filtered resin solution, advantageously with the application of reduced pressure.

The new resins thus obtained are generally colorless to yellowish colored substances. They are distinguished by being completely soluble in all proportions in the commercial benzines, even at ordinary temperature and also in drying oils. Due to their valuable solubility properties and their stability to light the new products constitute excellent basic materials for the manufacture of oil lacquers and plastic masses of high quality. Moreover, these resins can be worked up excellently with cellulose ethers to completely transparent and highly lustrous drying lacquers or with the addition of appropriate softening agents to valuable plastic masses.

According to the nature of the catalyst used the properties of the resins as regards solubility, melting point and color can be modified. Thus, for example, by means of tin tetrachloride very light colored resins are obtained, which are not soluble in the so-called "stand oils" prepared from lean, stored linseed oil by heating (compare Chemical Abstracts, Vol. VI, pp. 3190 and 3192), but dissolve in the customary drying oils. The use of borofluoro acetic acid as catalyst leads to nearly colorless, high melting resins, soluble in "stand oils", while, when sulfuric acid is used as catalyst, lower melting resins are formed, which are light brown in color and soluble in "stand oils". It is not necessary that the meta-substituted arylalkyl ethers should be used in a pure state. Technical mixtures of arylalkyl ethers can also be used, which besides meta substituents (advantageously in high proportion) also contain para or ortho substituents. Such substances are, for example, obtained by the alkylation of crude cresol or of technical xylenol mixtures.

When the meta-substituted arylalkyl ethers are replaced completely by the corresponding ortho- or para-substituted arylalkyl ethers, resins insoluble in oil and in benzine are obtained. Conversely, when crude solvent naphtha is treated with polymerizing agents without the addition of meta-substituted arylalkyl ethers, resins are always obtained, which at ordinary temperature are completely or mainly insoluble in aliphatic and hydroaromatic benzines.

The invention is illustrated by the following examples, but is not restricted thereto:

*Example 1.*—1000 parts by weight of a crude solvent naphtha, boiling between 160 and 185° C., free from bases and phenols and containing 54% of resinifiable constituents (cumarone and indene), are mixed with 85 parts by weight of m-xylene-methyl-ether and heated to 32° C., then 10 parts by weight of tin tetrachloride are run in gradually with vigorous stirring. The reaction temperature rises to 50° C. After stirring for 6 hours the reaction mass is diluted with 250 parts by weight of xylene and then stirred for about half an hour with about 60 parts by weight of quick lime while heating to 90–100° C. The resin solution is filtered from the precipitate and the volatile constituents distilled off completely in vacuo.

There are obtained 480 parts by weight of a very light colored resin melting at 148° C., which dissolves readily and completely in lacquer benzine, linseed oil and wood oil. These solutions remain completely clear, even at a low temperature.

*Example 2.*—20 parts by weight of molten ferric chloride ($FeCl_3.6H_2O$) are run gradually with vigorous stirring into a mixture (heated to 30° C.) of 300 parts by weight of the crude solvent naphtha, used in Example 1, with 25 parts by weight of m-toluene-methyl-ether.

The temperature rises to about 47° C. After stirring for 5 hours the mass is diluted with 100–150 parts by weight of purified solvent naphtha, filtered from solid substances and the filtrate is treated with heating and stirring with a mixture of 36 parts by weight of activated fuller's earth and 18 parts by weight of quick lime. The volatile constituents are distilled off in vacuo from the filtered solution. There are obtained 153 parts by weight of a light yellow resin, melting at 138° C., readily soluble in cyclohexane, aliphatic and hydroaromatic benzines, linseed oil, wood oil and linseed oil—"stand oil".

*Example 3.*—In 100 parts by weight of the crude solvent naphtha, used in Example 1, are dissolved 15 parts by weight of a toluene-methyl-ether, obtainable by the methylation of crude cresol (containing 55% of m-cresol). Into this solution heated to 40° C. is run with stirring one part by weight of borofluoro acetic acid. The temperature rises to about 54° C. After stirring for 6–7 hours the reaction liquid is heated for about half an hour to 80–90° C. with the addition of 6 parts by weight of calcium oxide. The precipitate is then filtered off. From the filtrate are obtained, in the manner described in Example 1, 52 parts by weight of a nearly colorless resin, melting at 113° C. and displaying the same solubility properties as the product obtained in Example 2.

*Example 4.*—A mixture, heated to 40° C., of 1000 parts by weight of crude solvent naphtha (limits of boiling point 163–182° C., content of cumarone and indene 52% and free from phenols and bases) with 86 parts by weight of m-xylene-ethyl-ether is treated as described in Example 3 with 10 parts by weight of borofluoro acetic acid. When the reaction is complete the reaction mass is diluted with 200 parts by weight of xylene or purified solvent naphtha and treated while hot with 60 parts by weight of calcium oxide or barium oxide.

There are obtained 545 parts by weight of a nearly colorless resin, which melts at 133° C. and possesses the same solubility properties as the resin obtainable in accordance with Example 2.

*Example 5.*—200 parts by weight of crude solvent naphtha used in Example 4 are treated with 17 parts by weight of xylene-methyl-ether, obtainable by the alkylation of a xylenol containing about 80% of m-xylenol. 3 to 5 parts by weight of concentrated sulfuric acid are run very slowly into the mixture at 15–20° C., whereupon the reaction temperature rises gradually to 60° C. After stirring for 3 to 5 hours the reaction mass is diluted with 50 parts by weight of a purified solvent naphtha, separated from the sulfuric acid, washed with sodium carbonate solution and then with sodium chloride solution. There are obtained 108 parts by weight of a pale brown resin, soluble in benzine and "stand oil" and melting at 94° C.

*Example 6.*—A mixture of 500 parts by weight of the crude solvent naphtha used in Example 4 with 51 parts by weight of m-xylene-ethyl-ether is stirred for 5 hours with the gradual addition of a solution of 10 parts by weight of antimony pentachloride in 40–50 parts by weight of tetrachloroethane, whereupon the temperature of the reaction rises from 27 to 57° C. The reaction liquid is then stirred vigorously for half an hour at 90–100° C. with 40 parts by weight of 32% caustic soda solution. The light colored resin solution is then separated from the sediment.

There are obtained 210 parts by weight of a light yellow resin, melting at 130° C. and soluble in lacquer benzine, linseed oil and wood oil.

I claim:

1. The proces which comprises stirring a mixture of a crude solvent naphtha and a m-substituted arylalkyl ether of the general formula:

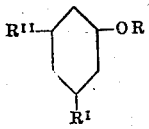

wherein R and R¹ stand for alkyl groups and R¹¹ stands for hydrogen which may be substituted by an alkyl group, with the addition of a polymerization catalyst of the group consisting of tin tetrachloride, zinc chloride, strong sulfuric acid, ferric chloride, borofluoro acetic acid and antimony pentachloride for several hours.

2. The process which comprises stirring a mixture of a crude solvent naphtha and 5 to 25% calculated on the amount of the resinifiable substance in the solvent naphtha of a m-substituted arylalkyl ether of the general formula:

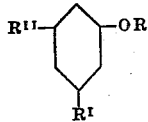

wherein R and R¹ stand for alkyl groups and R¹¹ stands for hydrogen which may be substituted by an alkyl group, with the addition of a polymerization catalyst of the group consisting of tin tetrachloride, zinc chloride, strong sulfuric acid, ferric chloride, borofluoro acetic acid and antimony pentachloride for several hours.

3. The process which comprises stirring a mixture of a crude solvent naphtha and a m-substituted arylalkyl ether of the general formula:

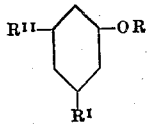

wherein R and R¹ stand for alkyl groups and R¹¹ stands for hydrogen which may be substituted by an alkyl group, with the addition of a polymerization catalyst of the group consisting of tin tetrachloride, zinc chloride, strong sulfuric acid, ferric chloride, borofluoro acetic acid and antimony pentachloride for several hours at a temperature below 90° C.

4. The process which comprises stirring a mixture of a crude solvent naphtha and 5 to 25% calculated on the amount of the resinifiable substance in the solvent naphtha of a m-substituted arylalkyl ether of the general formula:

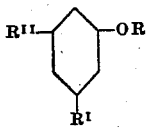

wherein R and R¹ stand for alkyl groups and R¹¹ stands for hydrogen which may be substituted by an alkyl group, with the addition of a polymerization catalyst of the group consisting of tin tetrachloride, zinc chloride, strong sulfuric acid, ferric chloride, borofluoro acetic acid and antimony pentachloride for several hours at a temperature below 90° C.

5. The process which comprises stirring a mixture of a crude solvent naphtha freed from phenols and bases and of a m-substituted arylalkyl ether of the general forula:

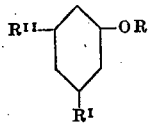

wherein R and R¹ stand for alkyl groups and R¹¹ stands for hydrogen which may be substituted by an alkyl group, with the addition of a polymerization catalyst of the group consisting of tin tetrachloride, zinc chloride, strong sulfuric acid, ferric chloride, borofluoro acetic acid and antimony pentachloride for several hours.

6. The process which comprises stirring a mixture of a crude solvent naphtha freed from phenols and bases and 5 to 25% calculated on the amount of the resinifiable substance in the solvent naphtha of a m-substituted arylalkyl ether of the general formula:

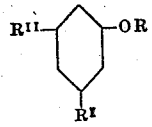

wherein R and R¹ stand for alkyl groups and R¹¹ stands for hydrogen which may be substituted by an alkyl group, with the addition of a polymerization catalyst of the group consisting of tin tetrachloride, zinc chloride, strong sulfuric acid, ferric chloride, borofluoro acetic acid and antimony pentachloride for several hours.

7. The process which comprises stirring a mixture of a crude solvent naphtha freed from phenols and bases and of a m-substituted arylalkyl ether of the general formula:

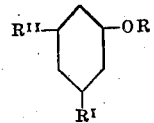

wherein R and R¹ stand for alkyl groups and R¹¹ stands for hydrogen which may be substituted by an alkyl group, with the addition of a polymerization catalyst of the group consisting of tin tetrachloride, zinc chloride, strong sulfuric acid, ferric chloride, borofluoro acetic acid and antimony pentachloride for several hours at a temperature below 90° C.

8. The process which comprises stirring a mixture of a crude solvent naphtha freed from phenols and bases and of 5 to 25% calculated on the amount of the resinifiable substance in the solvent naphtha of a m-substituted arylalkyl ether of the general formula:

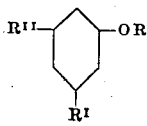

wherein R and $R^I$ stand for alkyl groups and $R^{II}$ stands for hydrogen which may be substituted by an alkyl group, with the addition of a polymerization catalyst of the group consisting of tin tetrachloride, zinc chloride, strong sulfuric acid, ferric chloride, borofluoro acetic acid and antimony pentachloride for several hours at a temperature below 90° C.

9. The process which comprises stirring a mixture of crude solvent naphtha freed from phenols and bases and of a m-substituted arylalkyl ether of the general formula:

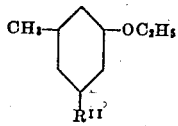

wherein $R^{II}$ stands for hydrogen which may be substituted by an alkyl group, with the addition of a borofluoro acetic acid as catalyst for several hours at a temperature below 90° C.

10. The process which comprises stirring a mixture of crude solvent naphtha freed from phenols and bases and of 5 to 25% calculated on the amount of the resinifiable substance in the solvent naphtha of m-xylene-ethyl-ether with the addition of borofluoroacetic acid for several hours at a temperature of from 40 to 90° C.

11. As new products synthetic resins obtainable according to a process as claimed in claim 1, being generally colorless to yellowish colored substances and being soluble in commercial benzines and in drying oils.

12. As new products synthetic resins obtainable according to a process as claimed in claim 2, being generally colorless to yellowish colored substances and being soluble in commercial benzines and in drying oils.

13. As new products synthetic resins obtainable according to a process as claimed in claim 3, being generally colorless to yellowish colored substances and being soluble in commercial benzines and in drying oils.

14. As new products synthetic resins obtainable according to a process as claimed claim 4, being generally colorless to yellowish colored substances and being soluble in commercial benzines and in drying oils.

15. As new products synthetic resins obtainable according to a process as claimed claim 5, being generally colorless to yellowish colored substances and being soluble commercial benzines and in drying oils.

16. As new products synthetic resins obtainable according to a process as claimed claim 6, being generally colorless to yellowish colored substances and being soluble commercial benzines and in drying oils.

17. As new products synthetic resins obtainable according to a process as claimed in claim 7, being generally colorless to yellowish colored substances and being soluble in commercial benzines and in drying oils.

18. As new products synthetic resins obtainable according to a process as claimed in claim 8, being generally colorless to yellowish colored substances and being soluble in commercial benzines and in drying oils.

19. As new products synthetic resins obtainable according to a process as claimed in claim 9, being generally colorless to yellowish colored substances and being soluble in commercial benzines and in drying oils.

20. As new products synthetic resins obtainable according to a process as claimed in claim 10, being generally colorless to yellowish colored substances and being soluble in commercial benzines and in drying oils.

In testimony whereof I have hereunto set my hand.

LEO ROSENTHAL. [L. S.]